United States Patent [19]

Leis et al.

[11] Patent Number: 4,849,711
[45] Date of Patent: Jul. 18, 1989

[54] AUTOMATIC GAIN CONTROL SYSTEM

[75] Inventors: Michael Leis, Framingham; Roy Gustafson, Boxboro, both of Mass.

[73] Assignee: Digital Equipment Corporation, Maynard, Mass.

[21] Appl. No.: 93,810

[22] Filed: Sep. 4, 1987

[51] Int. Cl.$^4$ .......................... H03G 3/10; H03F 1/36
[52] U.S. Cl. ........................................ 330/279; 330/86
[58] Field of Search .................. 330/86, 127, 129, 279

[56] References Cited

U.S. PATENT DOCUMENTS 4,553,104 11/1985 Olsen ................................. 330/279

Primary Examiner—Gene Wan
Attorney, Agent, or Firm—Fish & Richardson

[57] ABSTRACT

An AGC system for controlling the gain of an amplifier includes an AGC multiplexer and an AGC circuit. The AGC circuit receives an input signal from the AGC multiplexer and generates, in response thereto a gain control signal. The AGC multiplexer operates in three modes. In a first mode, in which the erased portion of a sector is being detected, the AGC multiplexer couples an input preset signal of a predetermined voltage level to the AGC circuit, enabling it, in turn, to generate a gain control signal to control the gain to a predetermined level. In a second mode, the AGC multiplexer couples a signal related to the output signal from the amplifier to the AGC circuit, enabling the AGC circuit to generate a gain signal related to the output level of the amplifier. In the third mode, the AGC multiplexer maintains its output signal constant, thus enabling the AGC circuit to maintain its gain control constant.

22 Claims, 2 Drawing Sheets

AUTOMATIC GAIN CONTROL SYSTEM

BACKGROUND OF THE INVENTION

1. Field of the Invention

The invention relates generally to the field of automatic gain control of an amplifier, and more specifically to provision of automatic gain control controlled by a plurality of sources.

2. Description of the Prior Art

In a digital data processing system, data is typically stored on magnetic disks in the form of magnetic transitions. Each disk is divided into a plurality of concentric tracks, with each track being at a predetermined location from the center of rotation of the disk. Each disk is also divided into a plurality of sectors, which represent a selected angular region of the disk. In addition, since each disk typically has two sides on which data may be written, the location of data is fully identified by a surface, track and sector identification. If a disk system has more than one disk, a disk identification may also be necessary.

A sector has several portions. A sector begins with an erased portion, followed by a preamble, the data and ends with a postamble. The erased section permits location of the preamble, which is essentially data which has a predetermined initial pattern which is selected to permit rapid timing synchronization. In addition, the preamble includes an address portion to permit identification of the sector, track, surface and disk. Following the address portion is the data.

A disk system typically includes an amplifier for amplifying the read signal from a read/write head. The amplifier's gain, or degree of amplification, is controlled by an automatic gain control (AGC) circuit, which effectively receives the output signal from the amplifier and controls the amplifier to ensure that the output signal is within a selected range. This prevents the output signal from becoming so large as to overload downstream circuitry, which can result in distortion and corruption of the data by the downstream circuitry.

Two problems arise in connection with a disk system in which amplification is controlled by an AGC circuit. The first is that, in trying to locate the erased portion of a sector, the gain level controlled by the AGC circuit cannot be too high or otherwise noise in the erased portion will prevent it from being recognized as the erased portion; the noise will appear erroneously as a recorded signal. The correct choice of gain may also vary over each disk as a result of variations over the disk surface. In addition, the correct choice of gain may vary from disk to disk, as a result of manufacturing variations among disks and heads. However, the correct choice of gain will assist in the speedy location of an erased portion, allowing it to be smaller, and, accordingly, allowing a disk to be divided into more sectors, allowing a disk to hold more data.

The second problem is that, in the data portion of the sector, the data pattern is unpredictable. Thus, there may be relatively long times in which a low signal is generated by the read/write head, as a result of which the AGC circuit will increase the gain of the amplifier. This may also result in the amplification of noise as the data signal, resulting in erroneous data. In addition, when valid transitions are finally detected on the disk, the signal generated by the amplifier may be so large as to cause distorted or corrupted data to be generated and transmitted to downstream circuitry.

SUMMARY OF THE INVENTION

The invention provides a new and improved AGC system which may be used to control an amplifier in a disk system used in a digital data processing system.

In brief summary, the AGC system for controlling the gain of an amplifier includes an AGC multiplexer and an AGC circuit. The AGC circuit receives an input signal from the AGC multiplexer and generates, in response thereto a gain control signal. The AGC multiplexer operates in three modes. In a first mode, in which the erased portion of a sector is being detected, the AGC multiplexer couples an input preset signal of a predetermined voltage level to the AGC circuit, enabling it, in turn, to generate a gain control signal to control the gain to a predetermined level. In a second mode, the AGC multiplexer couples a signal related to the output signal from the amplifier to the AGC circuit, enabling the AGC circuit to generate a gain signal related to the output level of the amplifier. This mode may be used during the preamble portion of the sector. In the third mode, the AGC multiplexer maintains its output signal constant, thus enabling the AGC circuit to maintain its gain control constant. This mode may be used, for example, during the data portion of a sector to maintain the gain constant during long portions in which the signal from the read/write head may be at a low level.

In another aspect of the invention, the AGC system may be used to preliminarily establish the gain of the amplifier during selected operations. A map is maintained of levels of the preset signal levels for each parameter of the operation which is required to enable the gain control signal to control the amplifier to produce a selected gain. During the selected operations, the preset signal is enabled to have the level determined by the map and the multiplexer couples the gain control signal to the AGC circuit in response thereto. If the AGC system is used in, for example, a disk storage system, and the parameters of the operation relate to the sector, track and read/write head, the preset signal level from the map can be used in an operation of, for example, determining the location of the erased portion of the sector.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1A:
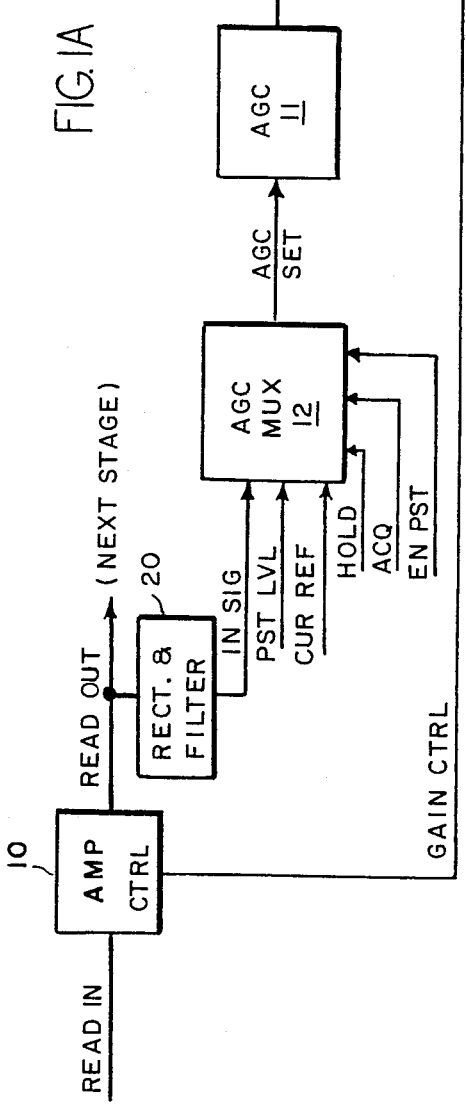
FIGS. 1A and 1B together depict a general block diagram of an amplification stage, including an amplifier and an automatic gain control path constructed accordance with the invention.
Figure 1B:
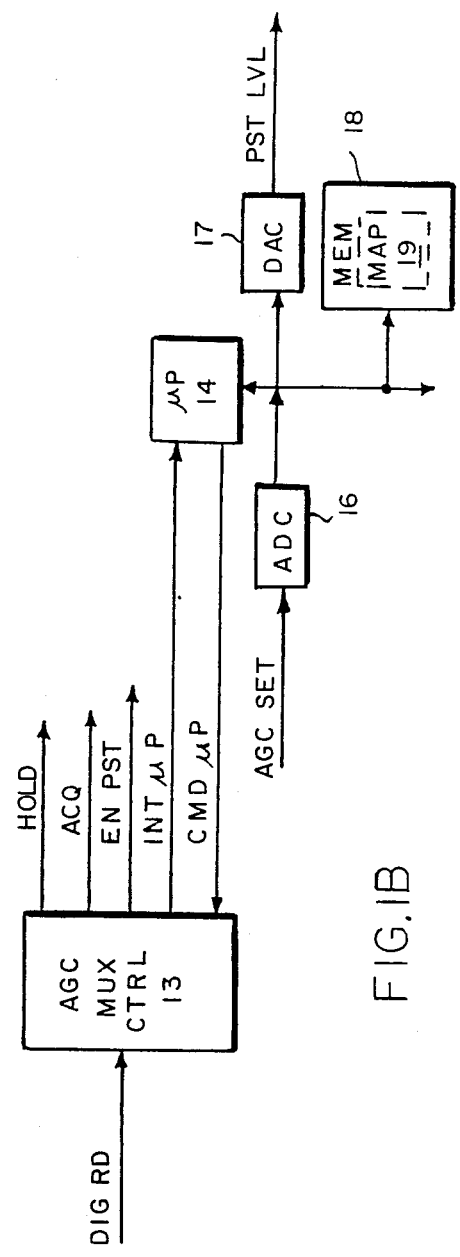

A system constructed in accordance with the invention is depicted in FIGS. 1A and 1B. With reference to FIG. 1A, an input amplifier circuit 10 receives a READ IN input signal from, for example, a conventional read/write head (not shown) which generates the READ IN input signal in response to magnetic transitions on a disk (also not shown). The amplifier 10, in response to a GAIN CTRL gain control signal from an automatic gain control (AGC) circuit 11, amplifies the READ IN input signal and generates in response thereto a READ OUT output signal which it transmits to downstream circuitry (not shown) such as a next amplifier stage or a data separator/phase-locked loop circuit which generates digital data and clocking signals in a conventional manner. The GAIN CTRL gain control signal controls the gain, or degree of amplification, of the amplifier 10.

As is conventional, the AGC path, which includes the AGC circuit 11 and an AGC multiplexer 12, may control the gain of the amplifier 10 typically in a feedback manner. The READ OUT output signal is coupled to a rectifier and filter circuit 20, which generates in response thereto an IN SIG input signal, which has a voltage level approximately corresponding to the average peak level of the rectified READ OUT signal from amplifier 10 over a selected time period. The IN SIG input signal is coupled to the AGC multiplexer 12. In response thereto, and to a CUR REF current reference signal from other circuitry (not shown), if an ACQ acquire signal is asserted, the AGC multiplexer 12 generates an AGC SET automatic gain control set signal whose voltage level, in turn, controls the AGC circuit 11. Alternatively, if an EN PST enable preset signal is asserted, the voltage level of the AGC SET signal from the AGC multiplexer 12 is controlled by the voltage level of a PST LVL preset level signal. On the other hand, if a HOLD signal is asserted, the voltage level of the AGC SET signal is controlled at its level when the HOLD signal was initially asserted.

The AGC multiplexer 12 is controlled by an AGC multiplexer control circuit 13 which is controlled by a microprocessor 14. The AGC multiplexer control circuit 13 receives a DIG RD digital read signal from the data separator circuit (not shown) and generates, in response thereto and to CMD uP command microprocessor signals from the microprocessor 14, the HOLD, ACQ acquire and EN PST enable preset signals which control the AGC multiplexer 12.

The microprocessor 14 communicates over a bus 15 with an analog to digital converter 16, a digital to analog converter 17 and a memory 18. The analog to digital converter receives the AGC SET signal from the AGC multiplexer 12 and generates an encoded digital signal identifying the voltage level of the AGC SET signal. Under control of the microprocessor 14, the encoded digital signal is stored in a selected location in a map 19 maintained in memory 18. The digital to analog converter 17 receives an encoded digital signal from map 19 over bus 15 and generates in response thereto the PST LVL preset level signal which has a voltage level representative of the encoded digital signal.

The AGC multiplexer 12 is used as follows. In a disk storage device, data is stored in concentric tracks, which are at differing distances from the center of the disk, and sectors, which represent angular sections of a disk. In addition, in a disk storage device there may be several disks and data may be stored on both sides of each disk. Within a sector, data is written first with an erased region, followed by a preamble, the data, and a postamble. In order to locate the beginning of the data recorded in the sector, it is necessary to locate the erased region.

Prior to the READ OUT read output signal indicating the erased region, the AGC multiplexer control 13 asserts the EN PST enable preset signal and generates an INT uP interrupt microprocessor signal which interrupts the microprocessor 14. In turn, the microprocessor 14 transmits an encoded digital signal to the digital to analog converter 17 which enables it to generate the PST LVL having a selected voltage level. If the AGC multiplexer control 13 is thereafter unable to detect the erased region within a selected amount of time, it interrupts the microprocessor 14 again. The microprocessor 14, in turn, provides an encoded digital signal to the digital to analog converter 17 enabling it to provide a PST LVL having a lower voltage level than before.

This continues until the READ OUT read output signal indicates to the AGC multiplexer control 13 that the erased region has been located. At that point, the AGC multiplexer control 13 again interrupts the microprocessor 14. Microprocessor 14, in turn, enables the analog to digital converter 16 to generate an encoded digital signal representative of the voltage level of the AGC SET signal from AGC multiplexer 12. This encoded digital signal is stored in the map 19 in a location associated with the particular read/write head generating the READ IN signal being processed by amplifier 10 and the track and sector in which the erased signal is being located.

The same procedure is followed to generate for map 19 values for all of the read/write heads, and for all of the tracks and sectors on the disks. Thereafter, in response to a request from the AGC multiplexer control 13 while it is trying to locate the erased region of a sector, the microprocessor can enable the digital to analog converter to provide, based on the encoded value stored in map 19, a PST LVL preset level signal which has a voltage level previously determined to enable the AGC circuit 11 to generate a GAIN CTRL gain control signal that enables the detection of the erased region of the sector.

Following detection of the erased region, the AGC multiplexer control 13 asserts the ACQ acquire signal which, in turn, enables the AGC multiplexer 12 to generate an AGC SET automatic gain control set signal which tracks the IN SIG input signal from amplifier 10. This generally occurs during the preamble section of the sector. During the data portion of the sector, the AGC multiplexer control 13 may then assert the HOLD signal to enable the AGC circuit to maintain the GAIN CTRL gain control signal at the level which it had at the end of the preamble portion of the sector. This may be useful if, for example, the data section has lengthy portions of no magnetic transitions. If that occurs, the READ OUT output signal will be at a low voltage level, and the AGC circuit 11 would generate a GAIN CTRL signal which would enable the gain of amplifier 10 to increase. The gain of amplifier 10 may increase to a point at which noise on the disk and in the circuitry upstream of the amplifier may corrupt the READ OUT output signal.

Figure 2:
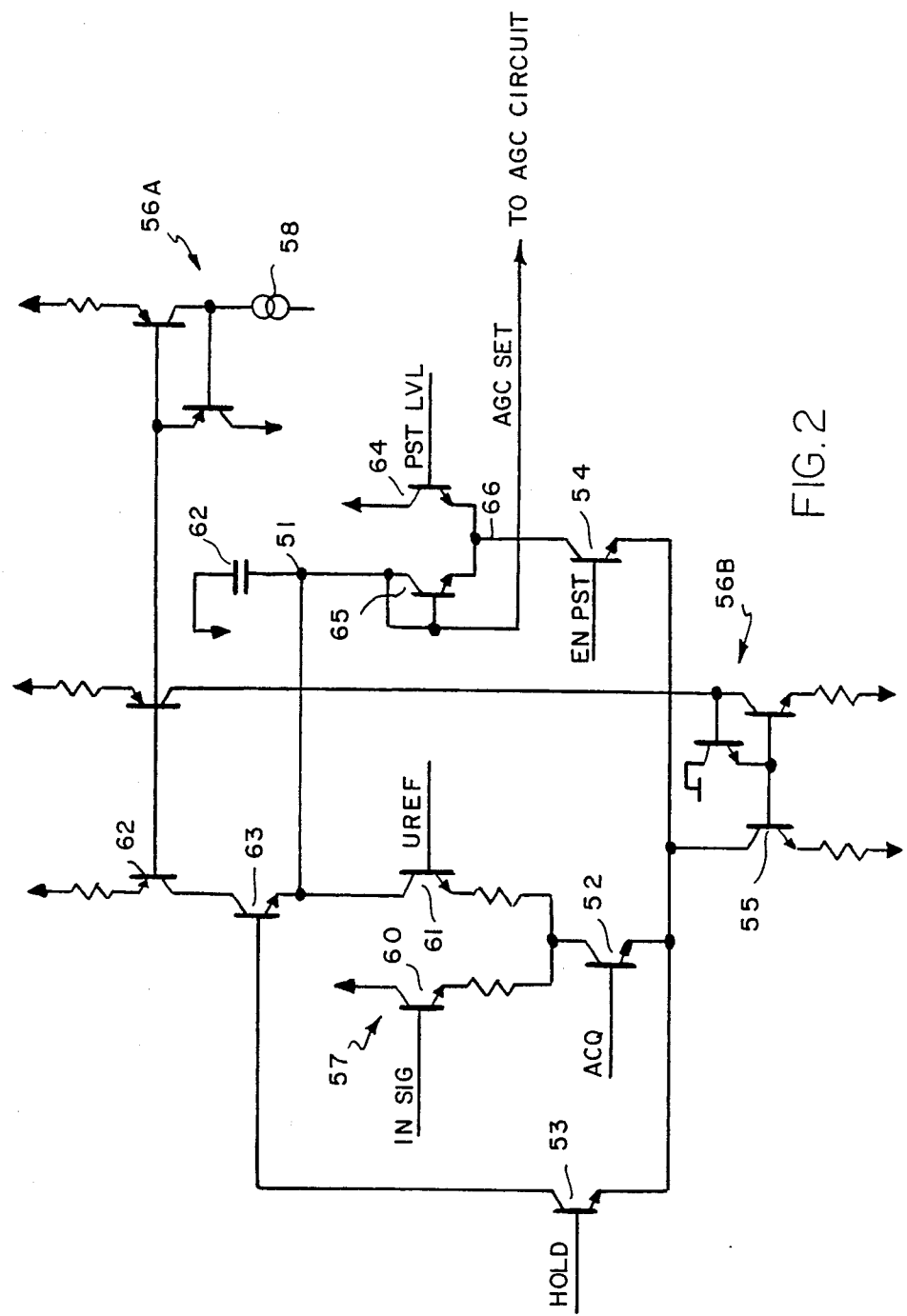
FIG. 2 is a detailed schematic circuit diagram of an AGC multiplexer circuit which is used in the automatic gain control path depicted in FIG. 1.

The automatic gain control (AGC) multiplexer 50 constructed in accordance with the invention is depicted in FIG. 2. The AGC multiplexer 50 generates an AGC SET signal to control a conventional AGC circuit, which, in turn, controls the gain of an amplifier circuit in a conventional manner. With reference to FIG. 2, the AGC multiplexer operates in three operating modes, namely an acquire mode, a hold mode and a preset level mode. In the acquire mode, which is enabled by an asserted ACQ acquire signal, the AGC multiplexer 50 operates in response to the IN SIG input signal. In the preset level mode, which is enabled if an EN PST enable preset signal is asserted, the AGC multiplexer 50 generates the AGC SET auto gain control set signal in response to an externally applied PST LVL preset level signal. Finally, in the hold mode, which occurs after either the acquire mode or preset level mode, and which is enabled by an asserted HOLD signal, the AGC multiplexer effectively maintains the voltage level of the AGC SET signal to control the AGC circuit at its level when the HOLD signal was asserted.

The voltage level of the AGC SET signal which controls the AGC circuit is governed by the voltage level at a node 51, which is, in turn related to the current which passes into node 51 from transistors 62 and 63 and the current which is permitted to flow out of the node as described below.

The ACQ acquire signal, the HOLD signal and the EN PST enable preset signal all control respective transistor switches 52, 53 and 54. Only one of the ACQ acquire signal, the HOLD signal and the EN PST enable preset signal is asserted at one time, and so only one of the respective switches 52, 53 and 54 is in its on condition at a time. In the on condition, a transistor switch 52, 53 and 54 couples current from its collector terminal to its emitter terminal.

The emitter terminals of all of the transistor switches 52, 53 and 54 are all connected to the collector terminal of a current source transistor 55. The current source transistor 55 controls the current passing through the on transistor switch 52, 53 or 54 to a level which is determined by the voltage level on its base terminal. The voltage level on the base terminal of the current source transistor is, in turn, controlled by a current source 58 and a current mirror circuit 56A and 56B.

Switch transistor 52, which is controlled by the ACQ acquire signal, in turn controls a differential amplifier 57 comprising two transistors 60 and 61. When the ACQ acquire signal is asserted, transistor 61 controls the amount of current which is permitted to drain from node 51, thereby controlling the voltage level of the AGC SET signal which is coupled to the downstream AGC circuit. The current level through the transistor 61 is related to the relationship between the voltage level of an IN SIG input signal which controls transistor 60 and the voltage level of a V REF voltage reference signal, which controls transistor 61.

As is conventional with differential amplifiers, when the voltage level of the IN SIG input signal is below the voltage level of the V REF voltage reference signal, more current passes through transistor 61 is than through transistor 60. As the voltage level of the IN SIG input signal increases and exceeds the voltage level of the V REF voltage reference signal, the current level of the transistor 60 increases, causing a concomitant decrease in the current passing through transistor 61. This, in turn, causes a decrease in current draining from node 51, increasing the voltage level of the AGC SET automatic gain control set signal to control the downstream AGC circuit.

Contrariwise, if the voltage level of the IN SIG input signal decreases below the voltage level of the V REF voltage reference signal, the current level through the transistor 60 decreases, causing a concomitant increase in the current passing through transistor 61. This, in turn, causes an increase in the current draining from node 51, decreasing the voltage level of the AGC SET automatic gain control set signal to control the downstream AGC circuit.

Transistor 54, which is controlled by the EN PST enable preset signal, also controls two transistors 64 and 65. Transistor 65 is effectively connected as a diode, with its collector terminal connected to its base terminal. Transistor 64 is controlled by the PST LVL preset level signal. The emitter terminals of the transistors 64 and 65 are connected together at a node 66, to which switch transistor 54 is also connected. The PST LVL preset level signal and the voltage level of node 51 effectively controls the relative current levels through the two transistors 66. That is, if the voltage level of node 51 is sufficiently low, in response to the PST LVL preset level signal, transistor 64 conducts more current to node 66 than transistor 65. Depending on the relative voltage levels of node 51 and node 66, transistor 65 may be in the back-biased so as not to conduct any current. In either case, the current from transistor 63 into node 51 is greater than the current which may flow out of node 51 through transistor 65, thereby increasing the voltage level of node 51.

This continues until the voltage level of node 51 increases until it is effectively greater than the voltage level of node 66. At that point, transistor 65 is forward biased, permitting current to flow out of node 51 to node 66. Depending on the relative amount of current flowing into node 51 from transistor 63 and the amount flowing out of node 51 through transistor 65, the voltage level of the node 51, and thus of the AGC SET automatic gain control set signal, may continue increasing. At some point in the increase in the voltage level of node 51, the amount of current flowing into node 51 from transistor 63 will equal the amount flowing out through transistor 65, and at that point the voltage level of the AGC SET signal will stop rising.

A similar operation occurs if the voltage level of node 51 is initially at a large level. At that point, when the EN PST enable preset signal turns on transistor 54, the transistor 65 conducts more current from node 51 to node 66 than is conducted into node 51, thus permitting the voltage level of node 51 to fall. In this condition, the amount of current flowing into node 66 from each of transistors 65 and 66 is also governed by the voltage level of node 51 and the voltage level of the PST LVL preset level signal. Current continues to flow from node 51 until the voltage level of node 51 decreases so that the current flow out of node 51 through transistor 65 matches the current flow out of transistor 63 into node 51.

The current at node 51, in addition to determining the voltage level of node 51, also serves to charge a capacitor 62. Thus, when the ACQ acquire and EN PST enable preset signals are both negated and the HOLD signal is asserted, differential amplifier 57, and specifically transistor 61, is turned off and switch transistor 53 is turned on. It will be appreciated that transistor 63, which serves to couple current from transistor 62 into node 51, is effectively connected as a diode with its collector terminal connected to its base terminal. Accordingly, when the HOLD signal is asserted and transistor 53 turned on, the collector and base terminals of transistor 63 are effectively coupled to current source 55. Since the voltage level of node 51 is higher than the voltage level provided by current source 55, the effective diode is back-biased, preventing current from flowing into node 51. Since switch transistors 52 and 54 are turned off by the negated ACQ acquire and EN PST enable preset signals, respectively, current cannot flow from node 51 therethrough, effectively ensuring that there is no current path from node 51 through current source 55. If the downstream AGC circuit effectively presents an infinite impedance to the AGC SET signal, which can be accomplished by a circuit which includes a field effect transistor at its input or by another conventional circuit, the AGC circuit will draw very little or no current from the node 51 and capacitor 62 will maintain its charge while the HOLD signal is asserted and transistor 53 is turned on. In that case, the voltage level of node 51, which corresponds to the voltage level of the AGC SET signal, is maintained at the voltage level provided by the capacitor 62.

The foregoing description has been limited to a specific embodiment of this invention. It will be apparent, however, that variations and modifications may be made to the invention, with the attainment of some or all of the advantages of the invention. Therefore, it is the object of the appended claims to cover all the such variations and modifications as come within the true spirit and scope of the invention.

What is claimed as new and desired to be secured by letters patent of the United States is:

1. An automatic gain control system for use in controlling the gain of amplifier generating an amplified signal comprising:
   A. automatic gain control means for generating an automatic gain control signal for controlling the gain level of said amplifier;
   B. preset automatic gain control storage means for storing predetermined gain values;
   C. multiplexer means connected to said amplifier, said preset automatic gain control storage means and said automatic gain control means for generating a gain control signal to control said automatic gain control means in response to either said amplified signal or a predetermined gain value in response to a mode control signal; and
   D. control means connected to said multiplexer means for generating said mode control signal to control the operation of said multiplexer means.

2. An automatic gain control amplifier as defined in claim 1 wherein said multiplexer means comprises:
   A. a multiplexer node for storing electrical charge;
   B. a current input connected to said multiplexer node for coupling current into said multiplexer node to thereby increase the level of electrical charge stored by said multiplexer node;
   C. an output connected to said multiplexer node for transmitting an output signal representative of the voltage level at said multiplexer node;
   D. an input signal switch connected to said multiplexer node responsive to said mode control signal and having an on condition for facilitating the flow of current from said multiplexer node to thereby control the electrical charge level at said multiplexer node in response to the voltage level of said amplified signal, and further having an off condition; and
   E. a preset level switch connected to said multiplexer node responsive to said mode control signal and having an on condition for facilitating the flow of current from said multiplexer node to thereby control the electrical charge level at said multiplexer node in response to the voltage level of said predetermined gain value, and further having an off condition.

3. An automatic gain control amplifier as defined in claim 2 wherein said current input includes:

A. a source input connected to said multiplexer node for facilitating flow of current into said multiplexer node to thereby couple electrical charge into said multiplexer node;
B. a drain output connected to said input signal switch and said preset level switch for regulating the flow of current through said input signal switch and said preset level switch; and
C. a current mirror connected to said source input and said drain output for regulating the drain output in response to the current through said source input.

4. An automatic gain control amplifier as defined in claim 3 wherein:
   A. said source input includes:
      i. a current input transistor connected to a power supply that provides current from the power supply regulated by said current mirror; and
      ii. a current switch connected between said current input transistor and said multiplexer node having an on condition during which current from said current input transistor flows to said multiplexer node, and off condition; and
   B. said automatic gain control amplifier further includes a hold switch for regulating the condition of said current switch in response to a hold control signal.

5. An automatic gain control amplifier as defined in claim 2 wherein said input signal switch comprises:
   A. an input signal switch node;
   B. an input signal switch transistor connected to said input signal switch node for controlling the flow of current from said input signal switch node in response to an input signal mode control signal to thereby control the voltage level of said input signal switch node; and
   C an input signal control circuit for controlling the flow of current from said multiplexer node to said input signal switch node in response to the voltage level of said input signal.

6. An automatic gain control amplifier as defined in claim 5 wherein said input signal control circuit comprises:
   A. an input signal transistor connected to said input signal switch node regulated in response to the voltage level of said input signal and of said input signal switch node; and
   B. an input signal reference transistor connected to said multiplexer node and said input signal switch node regulated in response to the voltage level of a reference signal and of said input signal switch node, to thereby regulate the amount of current flowing from said multiplexer node through said input signal switch.

7. An automatic gain control amplifier as defined in claim 2 wherein said preset level switch comprises:
   A. a preset level switch node;
   B. a preset level switch transistor connected to said preset level switch node for controlling the flow of current from said preset level switch node in response to a preset level operational mode control signal to thereby control the voltage level of said preset level switch node; and
   C. a preset level control circuit for controlling the flow of current from said multiplexer node to said preset level switch node in response to the voltage level of said preset level signal.

8. An automatic gain control amplifier as defined in claim 7 wherein said preset level control circuit comprises:
  A. a preset level signal transistor connected to said preset level switch node regulated in response to the voltage level of said preset level signal and of said preset level switch node; and
  B. a preset level reference transistor connected to said multiplexer node and said preset level switch node regulated in response to the voltage level of a reference signal and of said preset level switch node, to thereby regulate the amount of current flowing from said multiplexer node through said preset level switch.

9. An automatic gain control system as defined in claim 1 wherein said control means includes:
  A. mode control means connected to said amplifier for generating said mode control signal identifying a predetermined gain value mode and an input mode to enable said multiplexer means to select either said predetermined gain value or the amplified signal, respectively; and
  B. predetermined gain value selection means connected to said source control means and said preset automatic gain control storage means for enabling said preset automatic gain control storage means to couple a selected predetermined gain value to said multiplexer means when said mode control signal identifies said predetermined gain value mode.

10. An automatic gain control system as defined in claim 9 in which predetermined gain value selection means includes:
  A. a predetermined gain value store including a plurality of entries each storing a predetermined gain value; and
  B. predetermined gain value control means for selecting a predetermined gain value from said predetermined gain value store when said mode control means identifies the predetermined gain value mode.

11. An automatic gain control system as defined in claim 10 in which said entries in said predetermined gain value store stores predetermined gain values in digital form, said predetermined gain value control means further including a digital to analog converter to convert the selected predetermined gain value from digital form to analog form.

12. An automatic gain control system as defined in claim 11 in which said predetermined gain value control means further establishes the predetermined gain values for storage in said predetermined gain value store, said predetermined gain value control means including an analog to digital converter for converting an analog input signal to a digital value for storage in said predetermined gain value store.

13. An analog multiplexer circuit comprising:
  A. a multiplexer node for storing electrical charge;
  B. a current input connected to said multiplexer node for coupling current into said multiplexer node to thereby increase the level of electrical charge stored by said multiplexer node;
  C. an output connected to said multiplexer node for transmitting an output signal representative of the voltage level at said multiplexer node;
  D. an input signal switch connected to said multiplexer node having an on condition for facilitating the flow of current from said multiplexer node to thereby control the electrical charge level at said multiplexer node in response to the voltage level of said amplified signal, and further having an off condition; and
  E. a preset level switch connected to said multiplexer node having an on condition for facilitating the flow of current from said multiplexer node to thereby control the electrical charge level at said multiplexer node in response to the voltage level of said predetermined gain value, and further having an off condition.

14. An analog muliplexer circuit as defined in claim 13 wherein said current input includes:
  A. a source input connected to said multiplexer node for facilitating flow of current into said multiplexer node to thereby couple electrical charge into said multiplexer node;
  B. a drain output connected to said input signal switch and said preset level switch for regulating the flow of current through said input signal switch and said preset level switch; and
  C. a current mirror connected to said source input and said drain output for regulating the drain output in response to the current through said source input.

15. An analog multiplexer circuit as defined in claim 14 wherein:
  A. said source input includes:
    i. a current input transistor connected to a power supply that provides current from the power supply regulated by said current mirror; and
    ii. a current switch connected between said current input transistor and said multiplexer node having an on condition during which current from said current input transistor flows to said mltiplexer node, and off condition; and
  B. said analog multiplexer circuit further includes a hold switch for regulating the condition of said current switch in response to a hold control signal.

16. An analog multiplexer circuit as defined in claim 13 wherein said input signal switch comprises:
  A. an input signal switch node;
  B. an input signal switch transistor connected to said input signal switch node for controlling the flow of current from said input signal switch node in response to an input signal mode control signal to thereby control the voltage level of said input signal switch node; and
  C. an input signal control circuit for controlling the flow of current from said multiplexer node to said input signal switch node in response to the voltage level of said input signal.

17. An analog multiplexer circuit as defined in claim 16 wherein said input signal control circuit comprises:
  A. an input signal transistor connected to said input signal switch node regulated in response to the voltage level of said input signal and of said input signal switch node; and
  B an input signal reference transistor connected to said multiplexer node and said input signal switch node regulated in response to the voltage level of a reference signal and of said input signal switch node, to thereby regulate the amount of current flowing from said multiplexer node through said input signal switch.

18. An analog multiplexer circuit as defined in claim 13 wherein said preset level switch comprises:
  A. a preset level switch node;

B. a preset level switch transistor connected to said preset level switch node for controlling the flow of current from said preset level switch node in response to a preset level operational mode control signal to thereby control the voltage level of said preset level switch node; and C. a preset level control circuit for controlling the flow of current from said multiplexer node to said preset level switch node in response to the voltage level of said preset level signal.

19. An analog multiplexer circuit as defined in claim 18 wherein said preset level control circuit comprises:

A. a preset level signal transistor connected to said preset level switch node regulated in response to the voltage level of said preset level signal and of said preset level switch node; and B. a preset level reference transistor connected to said multiplexer node and said preset level switch node regulated in response to the voltage level of a reference signal and of said preset level switch node, to thereby regulate the amount of current flowing from said multiplexer node through said preset level switch.

20. An analog multiplexer circuit comprising:

A. a multiplexer node for storing electrical charge;

B. a current input connected to said multiplexer node comprising:
  i. a source input including:
    a. a current input transistor connected to a power supply that provides current from the power supply regulated by said current mirror;
    b. a current switch connected between said current input transistor and said multiplexer node having an on condition during which current from said current input transistor flows to said multiplexer node, and an off condition;
  ii. a drain output connected to said input signal switch and said preset level switch for regulating the flow of current through said input signal switch and said preset level switch;
  iii. a current mirror connected to said source input and said drain output for regulating the drain output in response to the current through said source input;

C. an output connected to said multiplexer node for transmitting an output signal representative of the voltage level at said multiplexer node;

D. an input signal switch comprising:
  i. an input signal switch node;
  ii. an input signal switch transistor connected to said input signal switch node for controlling the flow of current from said input signal switch node in response to an input signal mode control signal to thereby control the voltage level of said input signal switch node;
  iii. an input signal control circuit comprising:
    a. an input signal transistor connected to said input signal switch node regulated in response to the voltage level of said input signal and of said input signal switch node;
    b. an input signal reference transistor connected to said multiplexer node and said input signal switch node regulated in response to the voltage level of a reference signal and of said input signal switch node, to thereby regulate the amount of current flowing from said multiplexer node through said input signal switch;

E. a preset level switch connected to said multiplexer node having an on condition for facilitating the flow of current from said multiplexer node to thereby control the electrical charge level at said multiplexer node in response to the voltage level of said predetermined gain value, and further having an off condition; and F. a hold switch for regulating the condition of said current switch in response to a hold control signal.

21. An automatic gain control system for use in controlling the gain of an amplifier generating an amplified signal comprising:

A. automatic gain control means for generating an automatic gain control signal for controlling the gain level of said amplifier;

B. preset automatic gain control storage means for storing predetermined gain values;

C. multiplexer means connected to said amplifier, said preset automatic gain control storage means and said automatic gain control means for generating a gain control signal to control said automatic gain control means in response to either said amplified signal or a predetermined gain value in response to a mode control signal; and D. control means comprising:
  i. mode control means connected to said amplifier for generating said mode control signal identifying a predetermined gain value mode and an input mode to enable said multiplexer means to select either said predetermined gain value or the amplified signal, respectively; and
  ii. predetermined gain value selection means comprising:
    a. a predetermined gain value store including a plurality of entries each storing a predetermined gain value in digital form; and
    b. predetermined gain value control means for selecting a predetermined gain value from said predetermined gain value store when said mode control means identifies the predetermined gain value mode, including a digital to analog converter to convert the selected predetermined gain value from digital form to analog form and an analog to digital converter for converting an analog input signal to a digital value for storage in said predetermined gain value store.

22. An automatic gain control system for use in controlling the gain of an amplifier generating an amplified signal comprising:

A automatic gain control means for generating an automatic gain control signal for controlling the gain level of said amplifier;

B. preset automatic gain control storage means for storing predetermined gain values;

C. multiplexer means comprising:
  i. a multiplexer node for storing electrical charge;
  ii. a current input connected to said multiplexer node comprising:
    a. a source input including:
      I. a current input transistor connected to a power supply that provides current from the power supply regulated by said current mirror;
      II. a current switch connected between said current input transistor and said multiplexer node having an on condition during which current from said current input transistor flows to said multiplexer node, and an off condition;
b. a drain output connected to said input signal switch and said preset level switch for regulating the flow of current through said input signal switch and said preset level switch;
c. a current mirror connected to said source input and said drain output for regulating the drain output in response to the current through said source input;

iii. an output connected to said multiplexer node for transmitting an output signal representative of the voltage level at said multiplexer node;

iv. an input signal switch comprising:
a. an input signal switch node;
b. an input signal switch transistor connected to said input signal switch node for controlling the flow of current from said input signal switch node in response to an input signal mode control signal to thereby control the voltage level of said input signal switch node;
c. an input signal control circuit comprising:
I. an input signal transistor connected to said input signal switch node regulated in response to the voltage level of said input signal and of said input signal switch node;
II. an input signal reference transistor connected to said multiplexer node and said input signal switch node regulated in response to the voltage level of a reference signal and of said input signal switch node, to thereby regulate the amount of current flowing from said multiplexer node through said input signal switch;

v. a preset level switch connected to said multiplexer node having an on condition for facilitating the flow of current from said multiplexer node to thereby control the electrical charge level at said multiplexer node in response to the voltage level of said predetermined gain value, and further having an off condition; and
vi a hold switch for regulating the condition of said current switch in response to a hold control signal D. control means comprising:
i. mode control means connected to said amplifier for generating said mode control signal identifying a predetermined gain value mode and an input mode to enable said multiplexer means to select either said predetermined ga!value or the amplified signal, respectively; and
ii. predetermined gain value selection means comprising:
a. a predetermined gain value store including a plurality of entries each storing a predetermined gain value in digital form; and
b. predetermined gain value control means for selecting a predetermined gain value from said predetermined gain value store when said mode control means identifies the predetermined gain value mode, including a digital to analog converter to convert the selected predetermined gain value from digital form to analog form and an analog to digital converter for converting an analog input signal to a digital value for storage in said predetermined gain value store.

* * * * *